(12) United States Patent
Michalski

(10) Patent No.: US 12,338,957 B2
(45) Date of Patent: Jun. 24, 2025

(54) CRYOGENIC HYDROGEN TRANSFER PROCESS AND SYSTEM

(71) Applicant: F2M, Naintre (FR)

(72) Inventor: Eric Michalski, Lesigny sur Creuse (FR)

(73) Assignee: F2M, Naintre (FR)

( * ) Notice: Subject to any disclaimer, the term of this patent is extended or adjusted under 35 U.S.C. 154(b) by 5 days.

(21) Appl. No.: 18/249,507

(22) PCT Filed: Oct. 8, 2021

(86) PCT No.: PCT/EP2021/077926
§ 371 (c)(1),
(2) Date: Apr. 18, 2023

(87) PCT Pub. No.: WO2022/084071
PCT Pub. Date: Apr. 28, 2022

(65) Prior Publication Data
US 2023/0383909 A1 Nov. 30, 2023

(30) Foreign Application Priority Data
Oct. 19, 2020 (FR) ........................ 2010706

(51) Int. Cl.
*F17C 5/00* (2006.01)

(52) U.S. Cl.
CPC ........ *F17C 5/007* (2013.01); *F17C 2221/012* (2013.01); *F17C 2223/0161* (2013.01);
(Continued)

(58) Field of Classification Search
CPC ............... F17C 5/007; F17C 2221/012; F17C 2223/0161; F17C 2223/035;
(Continued)

(56) References Cited

U.S. PATENT DOCUMENTS 4,559,786 A * 12/1985 Schuck ............... F01B 9/02
417/901
5,520,000 A * 5/1996 Pevzner ............... F17C 7/02
62/48.1
(Continued)

FOREIGN PATENT DOCUMENTS

CN 209705707 U * 11/2019
FR 2987106 A1 8/2013
(Continued)

OTHER PUBLICATIONS

WO-2018012779-A1 English Translation of Specification (Year: 2024).*
(Continued)

*Primary Examiner* — Kenneth Rinehart
*Assistant Examiner* — Stephanie A Shrieves
(74) *Attorney, Agent, or Firm* — David D. Brush; Westman, Champlin & Koehler, P.A.

(57) ABSTRACT

A process for transferring hydrogen from a first tank wherein the hydrogen is in an initial liquid state at a pressure of the order of 10 bar to a second tank wherein the hydrogen is in a final state at a pressure greater than or equal to 500 bar. The process includes: a first pumping step of the hydrogen from the initial state thereof to an intermediate state wherein the hydrogen has a pressure greater than that of the initial state thereof; and a second pumping step of the hydrogen from the intermediate state thereof to bring it to the final state thereof. The first pumping step and the second pumping step are carried out respectively by mutually separate first compression and second compression elements.

8 Claims, 2 Drawing Sheets

(52) U.S. Cl.
CPC .. *F17C 2223/035* (2013.01); *F17C 2225/036* (2013.01); *F17C 2227/0135* (2013.01); *F17C 2250/043* (2013.01); *F17C 2250/0439* (2013.01); *F17C 2250/0626* (2013.01); *F17C 2265/032* (2013.01); *F17C 2270/0168* (2013.01)

(58) Field of Classification Search
CPC ........ F17C 2225/036; F17C 2227/0135; F17C 2250/043; F17C 2250/0439; F17C 2250/0626; F17C 2265/032; F17C 2270/0168; F17C 2225/0115; F17C 2227/0142; F17C 2227/0164; F17C 2227/0185; F17C 2250/032; F17C 5/00; Y02E 60/32; Y02P 90/45
USPC .......................................................... 141/11
See application file for complete search history.

(56) References Cited

U.S. PATENT DOCUMENTS

| | | | | |
|---|---|---|---|---|
| 7,201,018 | B2* | 4/2007 | Gershtein | F17C 7/04 |
| | | | | 62/601 |
| 9,845,917 | B2 | 12/2017 | Allidieres | |
| 2002/0157402 | A1* | 10/2002 | Drube | F17C 9/00 |
| | | | | 62/50.1 |
| 2012/0144846 | A1* | 6/2012 | Johanson | F17C 5/02 |
| | | | | 62/51.1 |
| 2013/0213059 | A1* | 8/2013 | Reese | F04B 37/14 |
| | | | | 62/56 |
| 2016/0169449 | A1 | 6/2016 | Allidieres | |
| 2016/0290297 | A1* | 10/2016 | Batenburg | F02D 19/023 |
| 2018/0128210 | A1* | 5/2018 | Garner | F02M 21/06 |
| 2019/0137041 | A1* | 5/2019 | Reese | F17C 13/04 |
| 2022/0074397 | A1* | 3/2022 | Crispel | F04B 15/08 |

FOREIGN PATENT DOCUMENTS

| | | | | |
|---|---|---|---|---|
| FR | 3008473 | A1 | 1/2015 | |
| FR | 3079006 | A1 | 9/2019 | |
| FR | 3090756 | A1 | 6/2020 | |
| JP | 2004316779 | A * | 11/2004 | |
| WO | WO-2018012779 | A1 * | 1/2018 | ............... F17C 5/04 |
| WO | 2019009794 | A1 | 1/2019 | |

OTHER PUBLICATIONS

JP-2004316779-A English Translation of Specification (Year: 2024).*
CN-209705707-U English Translation of Specification (Year: 2024).*
English translation of the Written Opinion of the International Searching Authority dated Nov. 4, 2021 for corresponding International Application No. PCT/EP2021/077926, filed Oct. 8, 2021.
International Search Report dated Nov. 4, 2021 for corresponding International Application No. PCT/EP2021/077926, filed Oct. 8, 2021.
Written Opinion of the International Searching Authority dated Nov. 4, 2021 for corresponding International Application No. PCT/EP2021/077926, filed Oct. 8, 2021.

* cited by examiner

CRYOGENIC HYDROGEN TRANSFER PROCESS AND SYSTEM

CROSS-REFERENCE TO RELATED APPLICATIONS

This application is a Section 371 National Stage Application of International Application No. PCT/EP2021/077926, filed Oct. 8, 2021, which is incorporated by reference in its entirety and published as WO 2022/084071 A1 on Apr. 28, 2022, not in English.

FIELD OF THE DISCLOSURE

The field of the invention relates to that of cryogenic medium compression processes.

The invention relates more specifically to a process for transferring hydrogen via a cryogenic compression of hydrogen from a liquid state to a gaseous state.

BACKGROUND OF THE DISCLOSURE

The expression "cryogenic medium" usually denotes low-temperature liquefied gas which has a relatively low temperature.

Cryogenic hydrogen is generally at a temperature between 20 K and 28 K.

Cryogenic medium compression processes are conventionally used for filling and decanting tanks, such as is the case when filling tanks of vehicles using hydrogen.

The French patent document published under the number FR2987106 describes a process for compressing a cryogenic medium, and more specifically cryogenic hydrogen.

According to this technique, cryogenic liquid hydrogen is compressed in two compression steps to change from an initial pressure to a final pressure via an intermediate pressure wherein the hydrogen is in a supercritical state.

This technique uses a pump device composed of two single-piston compressors driven by a common drive means which is for example an electric motor with a dual transmission.

The hydrogen in the initial state thereof is at a pressure between 1 and 3 bar.

Following the compression carried out in the compression chamber of the first compressor, the hydrogen is pumped into a compensation tank installed between the two compression chambers. The hydrogen is then in an intermediate state at a pressure between 30 and 70 bar.

Then, the compression carried out in the compression chamber of the second compressor makes it possible to bring the hydrogen to a final pressure of 400 bar.

Carrying out a process for compressing cryogenic hydrogen with two compression stages, of which the first is designed to bring the hydrogen to a supercritical state, makes it possible to improve the efficiency of an operation for transferring hydrogen from a storage in the liquid state and at low pressure to a tank wherein the hydrogen is in a gaseous state and has a pressure at levels between 700 and 900 bar.

However, there is still a need to improve the efficiency of this transfer operation.

Also, it should be noted that the compression means used are subject to particularly substantial constraints capable of impacting the efficiency thereof.

For example, one constraint particularly relates to the pressure differential between the initial hydrogen storage tank, wherein the hydrogen is at a pressure of the order of 10 bar, and the final tank, wherein the hydrogen is at a pressure capable of attaining 900 bar. The compressors used must this be designed to withstand the expected compression force.

Furthermore, pressure variations can be observed in the initial storage tank capable of negatively impacting the efficiency of the process. In particular, a completely full storage tank has an initial pressure, for example of bar, and sees this pressure decrease as the storage tank empties.

SUMMARY

An exemplary embodiment of the present disclosure relates to a process for transferring hydrogen from a first tank wherein the hydrogen is in an initial liquid state at a pressure of the order of 10 bar to a second tank wherein the hydrogen is in a final state at a pressure greater than or equal to 500 bar, the process comprising:
  a first step of pumping the hydrogen from the initial state thereof to an intermediate state wherein the hydrogen has a pressure greater than that of the initial state thereof;
  a second step of pumping the hydrogen from the intermediate state thereof to the final state thereof;
  the first pumping step and the second pumping step being carried out respectively by mutually separate first compression means and second compression means;
  characterised in that the first compression means and the second compression means each operate at an operating frequency, the operating frequencies being independent from one another, the operating frequency of the first compression means being controlled according to the hydrogen pressure at the end of the first pumping step to keep it within a pressure range at the end of the first pumping step corresponding to supercritical conditions.

By supercritical conditions, it is understood that the hydrogen is in a supercritical state, or in other words in a supercritical phase, corresponding to a known pressure range and temperature range (essentially a pressure range of 50 bar to 90 bar for a temperature of 28K to 40K).

Thanks to the process according to the invention, the hydrogen at the end of the first compression means is stabilised under supercritical conditions merely by the operation of the first compression means during the first pumping step.

The hydrogen in the intermediate state thereof is therefore in a supercritical state and remains in this supercritical state without requiring a release of this gas via a decompression valve as is the case in the prior art.

Thanks to the control of the operating frequency of the compression means to keep the hydrogen in a supercritical state at the end of the first compression means, then the second compressions means operate in a stable manner and do not need to make up for a hydrogen temperature and/or pressure variation outside supercritical conditions at the end of the first pumping step.

Consequently, the second pumping step which uses compression means supplying a relatively substantial force, is more efficient.

Thanks to the detection of the pressure of the hydrogen at the end of the first compression means, then variations are detected particularly induced by pressure fluctuations of the first tank. The automatic control of the operating frequency of the first compression means makes it possible to ensure that the hydrogen at the end of the first pumping step is still in a supercritical state, without needing to discharge excess hydrogen pressure to keep the hydrogen in the supercritical state thereof.

The process according to the invention thus has a superior efficiency to those of the prior art.

According to an advantageous feature, the operating frequency of the first compression means is also controlled according to the temperature of the hydrogen at the end of the first pumping step to keep it in a temperature range at the end of the first pumping step corresponding to supercritical conditions.

By recording the temperature at the end of the first pumping step, and in other words at the end of the first compression means, then it is easier to determine whether the hydrogen at the end of this first pumping step is in a supercritical state.

Indeed, with only the pressure, it is already possible to determine whether the hydrogen is in a supercritical state via calculations. However, by adding a temperature measurement, it is then easier to determine whether the hydrogen is indeed under supercritical conditions.

According to a preferred embodiment, the operating frequency of the first compression means is also controlled according to the pressure of the hydrogen in the first tank, to compress the hydrogen to a variable target pressure within the pressure range at the end of the first pumping step, the variable target pressure being dependent on the pressure of the hydrogen in the first tank.

This embodiment increases the efficiency of the process significantly.

Indeed, as the hydrogen transfer process is carried out, the first tank empties. This is followed by a drop in pressure in this first tank.

The pressure variation inside this first tank impacts the transfer process.

Thanks to the determination of the pressure of the hydrogen in the first tank and the definition of a variable target pressure within the pressure range for the control of the operating frequency of the first compression means, then it is possible to improve the efficiency of the process.

Advantageously, the process comprises a prior step of determining a correspondence table of the hydrogen pressures in the first tank with the target pressures at the end of the first pumping step, wherein, for a hydrogen pressure in the first tank:
a variation of a partial vaporisation value of the hydrogen arising between the first tank and the second compression means during a variation of the pressure within the pressure range at the end of the first pumping step is calculated;
the pressure, within the pressure range at the end of the first pumping step, which generates the lowest partial vaporisation value of the hydrogen, is selected, this pressure forming the target pressure within the pressure range at the end of the first pumping step.

In this way, the efficiency of the process is improved further.

Indeed, the process then makes it possible to obtain a particularly precise setting of the control of the operating frequency of the first compression means, particularly to compensate for the hydrogen leaks resulting from the partial vaporisation of this hydrogen inherent to this type of gas during any transfer process.

This prior determination step makes it possible to specifically ascertain the target pressure to which the hydrogen must be brought in the intermediate state thereof according to the actual pressure of this hydrogen in the first tank.

Thanks to this specific determination, then taking into account the actual physical characteristics of a hydrogen transfer installation implementing the transfer process, then the target pressure can fluctuate as the pressure of the hydrogen drops in the first tank during the transfer.

According to an advantageous feature, the second compression means are started up and kept in operation if the hydrogen is under supercritical conditions at the end of the first pumping step.

In this way, the second compression means do not operate if the hydrogen at the end of the first pumping step is not under supercritical conditions, which avoids operating the second compression means non-efficiently.

Advantageously, the process comprises a recovery of the gaseous hydrogen losses during the first pumping step and the second pumping step, and a reinjection of these gaseous hydrogen losses in the first tank.

Thanks to this recovery and this reinjection, the drop in pressure in the first tank resulting from the transfer of the liquid hydrogen from this tank is partially compensated.

These hydrogen losses can result from internal compression leaks, inherent to the compression of the hydrogen, or the partial vaporisation of the hydrogen.

The efficiency of the process is thus once again further improved.

Preferably, in the intermediate state thereof, the hydrogen has a pressure between 50 bar and 90 bar.

Advantageously, in the intermediate state thereof, the hydrogen has a temperature between 28 K and 40 K.

The invention also relates to a system for transferring hydrogen comprising:
a first tank wherein the hydrogen is in an initial liquid state at a pressure of the order of 10 bar;
a second tank wherein the hydrogen is in a final state at a pressure greater than or equal to 500 bar;
first compression means coupled with the first tank to extract hydrogen, compress it and send it into an intermediate volume;
second compression means separate from the first compression means, the second compression means being coupled with the intermediate volume and with the second tank to extract hydrogen from the intermediate volume, compress it and send it into the second tank, characterised in that it also comprises:
at least one intermediate sensor, of which a pressure sensor intended to record the pressure in the intermediate volume;
first automatic control means to control the operating frequency of the first compression means according to the pressure recorded by the pressure sensor of the intermediate sensor(s), with a view to keeping the hydrogen of the intermediate volume in a supercritical state.

Such a system has the advantages of the method described above, and particularly a superior efficiency to that of the hydrogen transfer systems according to the prior art.

Advantageously, the intermediate sensors also comprise a temperature sensor.

Similarly to the advantages described above, adding a temperature sensor at the intermediate sensors facilitates the determination of the supercritical state in the intermediate volume.

According to an advantageous feature, the transfer system comprises a pressure sensor associated with the first tank, and the first automatic control means incorporate means for defining a variable target pressure within a pressure range corresponding to supercritical conditions, the variable target pressure being dependent on a pressure recorded in the first tank, the first automatic control means modulating the operating frequency of the first compression means to attain the variable target pressure in the intermediate volume.

In this way, the transfer system also accounts for the pressure variation of the first tank as the hydrogen is transferred.

The efficiency of the system is thus improved.

BRIEF DESCRIPTION OF THE DRAWINGS

Further features and advantages of the invention will become more apparent on reading the following description of a preferential embodiment of the invention, given by way of illustrative and non-limiting example, and the appended drawing.

DETAILED DESCRIPTION OF ILLUSTRATIVE EMBODIMENTS

Figure 1:
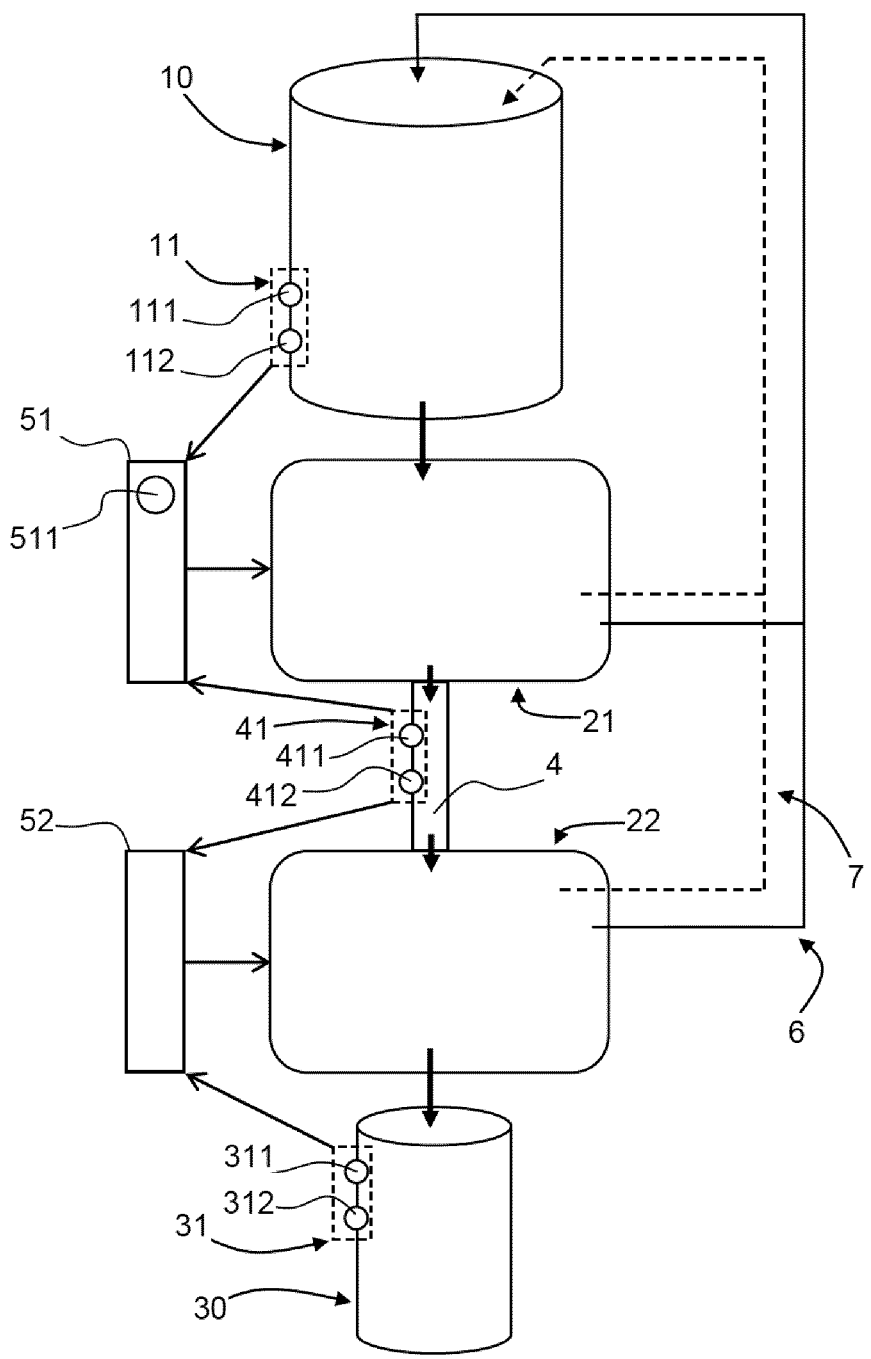
FIG. 1 is a schematic representation illustrating a hydrogen transfer system according to the invention.
Figure 2:
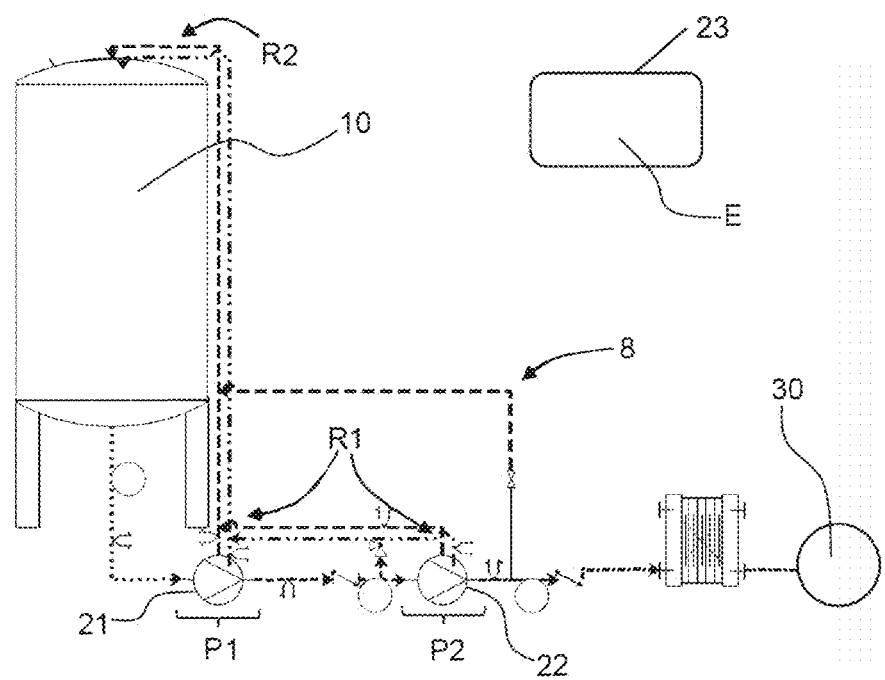
FIG. 2 is a schematic illustration illustrating a hydrogen transfer process according to the invention.

With reference to FIGS. 1 and 2, a hydrogen transfer system according to the invention, and a hydrogen transfer process according to invention are described hereinafter.

This hydrogen transfer system comprises:
a first tank 10;
first compression means 21;
second compression means 22;
a second tank 30.

The hydrogen transfer system and process are intended to transfer hydrogen from the first tank 10 to the second tank 30.

In the first tank, the hydrogen is in an initial liquid state at a pressure of the order of 10 bar.

As a general rule, in the first tank, the hydrogen, in the initial state thereof, can vary between a pressure of 1 bar and a pressure of 12 bar. More commonly, the pressure varies between 6 bar and 10 bar.

In this first tank 10, the hydrogen is conventionally at a temperature of 20 K and tends to be maintained at this temperature.

In the second tank 30, the hydrogen is intended to be in a final state at a pressure greater than or equal to 500 bar. Particularly, the hydrogen can reach a pressure greater than 900 bar.

The hydrogen is stored in this second tank 30 at a temperature of approximately 100 K.

The second tank can correspond to a vehicle tank.

The first compression means 21 are coupled with the first tank 10 to extract the hydrogen from the first tank 10.

The first compression means 21 compress the hydrogen and send it into an intermediate volume 4.

This intermediate volume 4 corresponds particularly to a pipe connecting the first compression means 21 to the second compression means 22.

The second compression means 22 are coupled with the intermediate volume 4 and with the second tank 30.

The first compression means 21 and the second compression means 22 are each formed by a cryogenic pump having a specific operating frequency. For example, these cryogenic pumps can be driven by electric motors.

The second compression means 22 are separate from the first compression means 21, i.e. the second compression means 22 and the first compression means 21 are not formed by a single cryogenic pump.

The first compression means 21 and the second compression means 22 each operate at their own operating frequency.

The second compression means 22 extract hydrogen from the intermediate volume 4, compress it, and send it into the second tank 30.

According to the present embodiment, the transfer system also comprises:
initial sensors 11, associated with the first tank 10;
intermediate sensors 41, associated with the intermediate volume 4;
final sensors 31, associated with the second tank 30.

More specifically, the initial sensors 11 comprise a pressure sensor 111 and a temperature sensor 112 intended respectively to record a pressure and a temperature in the first tank 10.

The intermediate sensors 41 comprise for their part a pressure sensor 411 and a temperature sensor 412 which are intended respectively to record a pressure and a temperature in the intermediate volume 4.

The final sensors 31 comprise a pressure sensor 311 and a temperature sensor 312 intended respectively to record a pressure and a temperature in the second tank 30.

According to the principle of the invention, the hydrogen transfer system also comprises first automatic control means 51.

These first automatic control means 51 control the operating frequency of the first compression means 21.

In other words, the first automatic control means 51 control the operating frequency of the first compression means 21.

These first automatic control means 51 are associated with the initial sensors 11 and with the intermediate sensor 41, and particularly with the pressure sensor 411.

Principally, the first automatic control means 51 control the operating frequency of the first compression means 21 according to the pressure recorded by the pressure sensor 411 of the intermediate sensors 41.

According to the principle of the invention, the first automatic control means 51 carry out this automatic control with a view to keeping the hydrogen of the intermediate volume 4 in a supercritical state.

By supercritical state, it is conventionally understood that the fluid in question, here hydrogen, is kept beyond the critical point thereof characterised by a specific temperature and pressure, and is not solid, gaseous, or liquid. This supercritical state is also known as "supercritical phase".

According to the present embodiment, the first automatic control means 51 comprise definition means 511 of a variable target pressure within a pressure range corresponding to supercritical conditions, or in other words to a supercritical state of the hydrogen.

As detailed hereinafter, the variable target pressure is dependent on a pressure recorded in the first tank 10.

The first automatic control means 51 modulate the operating frequency of the first compression means 21 to attain the variable target pressure in the intermediate volume 4.

These first automatic control means 51 can particularly be formed by an electronic controller.

The hydrogen transfer system also comprises, according to the present embodiment, second automatic control means 52 which are associated with the intermediate sensors 41 and with the final sensors 31.

The second automatic control means 52 are coupled with the second compression means 22 to control the operating frequency thereof.

These second automatic control means 52 can particularly be formed by an electronic controller.

Finally, the transfer system according to the present embodiment comprises gaseous hydrogen loss recovery circuits.

More specifically, the system comprises:
a first circuit 6 for recovering internal gaseous hydrogen compression leaks, and
a second circuit 7 for recovering gaseous hydrogen resulting from partial vaporisation (also known as "boil-off")

These recovery circuits are coupled with the first tank 10, with the first compression means 21 and with the second compression means 22.

The recovery circuits recover gaseous hydrogen losses arising at the first compression means 21 and second compression means 22 to reinject them into the first tank 10.

The temperatures of the gaseous hydrogen losses can be recorded and analysed in order to ensure the proper operation of the system.

Consequently, a drop in pressure arising in the first tank 10 under the end of the hydrogen transfer is partially compensated by the reinjection of the gaseous hydrogen losses into the first tank 10.

The hydrogen transfer system described above implements the transfer process according to the invention.

With reference to FIG. 2, this hydrogen transfer process comprises:
a first pumping step P1 of the hydrogen from the initial state thereof to an intermediate state wherein the hydrogen has a pressure greater than that of the initial state thereof;
a second pumping step P2 of the hydrogen from the intermediate state thereof to bring it to the final state thereof.

The first hydrogen pumping step P1 is implemented by the first compression means 21 and by the first automatic control means 51.

The second pumping step P2 is for its part implemented by the second compression means 22 as well as by the second automatic control means 52.

The first pumping step P1 and the second pumping step P2 are carried out respectively by compression means which are separate from one another, as explained above.

The first compression means 21 and the second compression means 22 each operate at an operating frequency independent from one another, i.e. the operating frequency of the second compression means 22 is not mechanically linked with the operating frequency of the first compression means 21.

During the first pumping step P1, and according to the principle of the invention, the operating frequency of the first compression means 21 is controlled according to the pressure of the hydrogen at the end of the first pumping step P1, or in other words, at the end of the first compression means 21, in the intermediate volume 4.

This automatic control is designed to keep the pressure of the hydrogen in the intermediate volume 4 in a pressure range corresponding to supercritical conditions of the hydrogen.

In the intermediate state thereof, the hydrogen must have a pressure being 50 bar and 90 bar, and a temperature between 28 K and 40 K.

Within these ranges, the hydrogen, in the intermediate state thereof, must also be in a supercritical state, and the pressure and temperature conditions are thus referred to as supercritical conditions.

According to the present embodiment of the process, the operating frequency of the first compression means 21 is also controlled according to the temperature of the hydrogen at the end of the first pumping step P1 to keep it within a temperature range, at the end of the first pumping step P1, corresponding to supercritical conditions.

Again according to the present embodiment, the operating frequency of the first compression means 21, during the first pumping step P1, is also controlled according to the pressure of the hydrogen in the first tank 10, to compress the hydrogen to a pressure, referred to as "variable target pressure", within the pressure range at the end of the first pumping step P1.

This variable target pressure is dependent on the pressure of the hydrogen in the first tank 10.

In particular, within the pressure range corresponding to supercritical conditions of the hydrogen, a target pressure is determined, and it is to attain this target pressure that the operating frequency of the first compression means 21 is modulated. The operating frequency of the first compression means 21 varies thus to increase to decrease the pressure in the intermediate volume 4 to keep it in a temperature range corresponding to supercritical conditions of the hydrogen.

To simplify the automatic control of the first compression means 21, the process comprises a prior determination step E of a correspondence table of the hydrogen pressures in the first tank 10 with the target pressures at the end of the first pumping step P1.

Thanks to this correspondence table, it is then possible to obtain, for a given pressure of the hydrogen in the first tank 10, detected using the pressure sensor 111 of the initial sensors 11, to which target pressure the first pumping step P1 must bring the hydrogen in the intermediate volume 4.

During the prior determination step E of a correspondence table, and for a pressure of the hydrogen in the first tank 10, then successively:
a variation of a partial vaporisation value of the hydrogen arising between the first tank 10 and the second compression means 22 during a variation of the pressure within the pressure range at the end of the first pumping step P1 is calculated;
the pressure, within the pressure range at the end of the first pumping step P1, which generates the lowest partial vaporisation value of the hydrogen, is selected, this pressure forming the target pressure within the pressure range at the end of the first pumping step P1.

This prior determination step E can be implemented by computing means (computer 23) via a model to facilitate the calculation and selection of the target pressures corresponding to the pressures of the hydrogen in the first tank 10.

Thus, for each pressure in the first tank 21, a target pressure to be attained within the pressure range at the end of the first pumping step P1 is obtained.

In this way, the operating frequency of the first compression means 21 is optimised to limit the partial vaporisation of the hydrogen between the first tank 10 and the second compression means 22.

Each calculation of the partial vaporisation of the hydrogen accounts for the pressure of the first tank 10, the final pressure which must be attained in the second tank 30, seal leak flows from the system, heat losses from the system, heat losses by seal friction, heat losses due to compressions, and heat losses due to the ejection of the hydrogen at the end of the compression means.

The definition means 511 are programmed with the correspondence table so as to make it possible to determine the momentary target pressure, corresponding to the pressure recorded in the first tank 10 by the initial sensors 11, at which the first compression means 21 must compress and eject the hydrogen in the intermediate volume 4.

During the second pumping step P2, the second compression means 22 are started up and kept in operation if the hydrogen is under supercritical conditions at the end of the first pumping step P1.

This start-up of the second compression means 22 is carried out by the second automatic control means 52.

In this way, the second compression means 22 only operate when the hydrogen located in the intermediate volume 4 is in a supercritical state.

The process finally comprises a recovery R1 of the gaseous hydrogen losses during the first pumping step P1 and the second pumping step P2, as well as a reinjection R2 of these gaseous hydrogen losses in the first tank 10.

This recovery R1 and this reinjection R2 are implemented by the first circuit 6 and the second circuit 7 of the recovery circuits.

With reference to FIG. 2, the system and the process also comprise return 8 of cooling used when the second tank 30 is not available.

Furthermore, the system can provide a valve for discharging overpressure between the first compression means 21 and the second compression means 22 in order to avoid damaging the system in the case of failure and the onset of excessive overpressure at the level of the system.

An exemplary embodiment of the present disclosure meets at least one of the needs discussed in the Background section.

More specifically, an exemplary embodiment of the present disclosure provides a process for compressing cryogenic hydrogen of the type described in the patent document published under the number FR2987106, the efficiency of which is improved.

An exemplary embodiment of the present disclosure provides such a process making is possible to optimise the operation and the efficiency of the compression means used.

An exemplary embodiment of the present disclosure provides such a process which accounts for the drop in pressure occurring in an initial storage tank of the liquid hydrogen.

Although the present disclosure has been described with reference to one or more examples, workers skilled in the art will recognize that changes may be made in form and detail without departing from the scope of the disclosure and/or the appended claims.

The invention claimed is:

1. A process comprising:
transferring hydrogen from a first tank wherein the hydrogen is in an initial liquid state at a pressure of the order of 10 bar to a second tank wherein the hydrogen is in a final state at a pressure greater than or equal to 500 bar, the transferring comprising:
a first pumping step of the hydrogen from the initial state thereof to an intermediate state wherein the hydrogen has a pressure greater than that of the initial state thereof;
a second pumping step of the hydrogen from the intermediate state thereof to bring the hydrogen to the final state thereof,
the first pumping step and the second pumping step being carried out respectively by mutually separate first and second compression elements,
wherein the first compression element and the second compression element each operate at an operating frequency, the operating frequencies being independent from one another, the operating frequency of the first compression element being controlled according to the pressure of the hydrogen at the end of the first pumping step to keep the pressure within a pressure range at the end of the first pumping step corresponding to supercritical conditions,
wherein the operating frequency of the first compression element is also controlled according to the pressure of the hydrogen in the first tank, to compress the hydrogen to a variable target pressure within the pressure range at the end of the first pumping step, the variable target pressure being dependent on the pressure of the hydrogen in the first tank,
the method further comprising, prior to the transferring, determining a correspondence table of the hydrogen pressures in the first tank with target pressures at the end of the first pumping step, wherein, for a hydrogen pressure in the first tank:
a variation of a partial vaporisation value of the hydrogen arising between the first tank and the second compression element during a variation of the pressure within the pressure range at the end of the first pumping step is calculated;
the pressure, within the pressure range at the end of the first pumping step, which generates the lowest partial vaporisation value of the hydrogen, is selected, this pressure forming the target pressure within the pressure range at the end of the first pumping step.

2. The process according to claim 1, wherein the operating frequency of the first compression element is also controlled according to a temperature of the hydrogen at the end of the first pump step to keep the temperature in a temperature range at the end of the first pumping step corresponding to supercritical conditions.

3. The process according to claim 1, comprising starting up the second compression element and keeping the second compression element in operation in response to the hydrogen being at supercritical conditions at the end of the first pumping step.

4. The process according to claim 1, comprising recovering gaseous hydrogen losses during the first pumping step and the second pumping step, and re-injecting these gaseous hydrogen losses in the first tank.

5. The process according to claim 1 wherein, in the intermediate state thereof, the hydrogen has a pressure between 50 bar and 90 bar.

6. A system for transferring hydrogen comprising:
a first tank to contain the hydrogen at an initial liquid state;
a second tank to contain the hydrogen at a final state;
a first compression element coupled with the first tank to extract hydrogen, compress the hydrogen and send the hydrogen into an intermediate volume;
a second compression element separate from the first compression element, the second compression element being coupled with the intermediate volume and with the second tank to extract hydrogen from the intermediate volume, compress the hydrogen and send the hydrogen into the second tank,
at least one intermediate sensor, comprising a pressure sensor to record a pressure in the intermediate volume;
a first automatic controller to control an operating frequency of the first compression element according to the pressure recorded by the pressure sensor of the at least one intermediate sensor, with a view to keeping the hydrogen of the intermediate volume in a supercritical state, wherein the operating frequency of the first compression element is also controlled according to the pressure of the hydrogen in the first tank, to compress the hydrogen to a variable target pressure within a pressure range in the intermediate volume corresponding to supercritical conditions, the variable target pressure being dependent on the pressure of the hydrogen in the first tank, a computer, which is configured to determine a correspondence table of the hydrogen pressures in the first tank with target pressures in the intermediate volume, wherein, for a hydrogen pressure in the first tank:

a variation of a partial vaporisation value of the hydrogen arising between the first tank and the second compression element during a variation of the pressure within the pressure range in the intermediate volume is calculated; and the pressure, within the pressure range in the intermediate volume, which generates the lowest partial vaporisation value of the hydrogen, is selected, this pressure forming the target pressure within the pressure range in the intermediate volume.

7. The system according to claim 6, wherein the at least one intermediate sensor also comprises a temperature sensor.

8. The system according to claim 6, further comprising a pressure sensor associated with the first tank, and wherein the first automatic controller is configured to modulate the operating frequency of the first compression element to attain the variable target pressure in the intermediate volume.

* * * * *